United States Patent
Calder et al.

(10) Patent No.: US 7,475,394 B2
(45) Date of Patent: Jan. 6, 2009

(54) SYSTEM AND METHOD OF ANALYZING INTERPRETED PROGRAMS

(75) Inventors: Brad Calder, San Diego, CA (US); Todd Austin, Ann Arbor, MI (US); Don Yang, Covina, CA (US); Timothy Sherwood, Santa Barbara, CA (US)

(73) Assignee: ARM Limited (GB)

( * ) Notice: Subject to any disclaimer, the term of this patent is extended or adjusted under 35 U.S.C. 154(b) by 765 days.

(21) Appl. No.: 10/729,100

(22) Filed: Dec. 5, 2003

(65) Prior Publication Data

US 2005/0125777 A1 Jun. 9, 2005

(51) Int. Cl.
G06F 9/45 (2006.01)
(52) U.S. Cl. .................... 717/158; 717/139; 717/141
(58) Field of Classification Search ......... 717/114–154, 717/158, 139, 141
See application file for complete search history.

(56) References Cited

U.S. PATENT DOCUMENTS

| | | | |
|---|---|---|---|
| 5,539,907 A | 7/1996 | Srivastava et al. | |
| 5,732,273 A | 3/1998 | Srivastava et al. | |
| 5,953,534 A | 9/1999 | Romer et al. | |
| 5,963,740 A | 10/1999 | Srivastava et al. | |
| 6,014,513 A | 1/2000 | Voelker et al. | |
| 6,049,666 A | 4/2000 | Bennett et al. | |
| 6,298,481 B1 | 10/2001 | Kosaka et al. | |
| 6,502,237 B1 * | 12/2002 | Yates et al. | 717/136 |
| 6,662,359 B1 * | 12/2003 | Berry et al. | 717/130 |
| 6,728,955 B1 * | 4/2004 | Berry et al. | 717/158 |
| 7,114,150 B2 * | 9/2006 | Dimpsey et al. | 717/131 |
| 2002/0091995 A1 * | 7/2002 | Arnold et al. | 717/124 |
| 2002/0092003 A1 | 7/2002 | Calder et al. | |
| 2003/0192036 A1 * | 10/2003 | Karkare et al. | 717/158 |
| 2005/0039171 A1 * | 2/2005 | Avakian et al. | 717/127 |
| 2005/0039187 A1 * | 2/2005 | Avakian et al. | 719/310 |

* cited by examiner

Primary Examiner—Lewis A. Bullock, Jr.
Assistant Examiner—Insun Kang
(74) Attorney, Agent, or Firm—Knobbe, Martens, Olson & Bear LLP

(57) ABSTRACT

A method for analyzing the performance of a program when running in an interpreted environment. An interpreter is a program that translates and executes another program. To analyze a binary in an interpreted environment, a mechanism is used to indicate points in the program at source, intermediate, or binary showing where information about the system is to be tracked/profiled/analyzed. Once these analysis points are determined, triggers are created in a separate file or inserted via program instrumentation into the binary to indicate to the interpreter when the analysis triggers need to be processed. The system being analyzed is then run via an interpreter. When one of these triggers occurs during execution, the interpreter calls analysis code passing it the appropriate information so that it may track statistics, metrics, and information about the program corresponding to the trigger.

46 Claims, 10 Drawing Sheets

SYSTEM AND METHOD OF ANALYZING INTERPRETED PROGRAMS

BACKGROUND OF THE INVENTION

1. Field of the Invention

The invention generally relates to electronic devices. More particularly, the invention relates to analyzing the behavior of binary programs executing in an interpreted environment.

2. Description of the Related Technology

Understanding a program's behavior is vital for all software and hardware developers in order to create reliable, correct, performance, power and energy efficient solutions or hardware designs for a given workload or problem. Certain program analysis methods allow a user to analyze a systems behavior by sampling the systems performance using software instrumentation, hardware counters or a combination of these two.

Software instrumentation adds analysis code to a program at a variety of different levels. The analysis code could be added at the source level, intermediate level or at the binary level to perform some analysis of the program's behavior. At the source level, source code is added to perform the desired analysis. At the binary level (either a portable binary form or native binary form) binary instructions are inserted into the binary program to perform the appropriate gathering of analysis information. When the binary program is run, the analysis code is executed and it tracks statistics about the program's behavior. The statistics are then analyzed by software or a human to find performance and correctness issues about the program. The program may be a single stand alone executable, or may consist of an executable with many dynamically loaded libraries, or it may be a complete operating system with many processes running.

In certain systems the analysis code is either added by statically linking it with the binary to be analyzed, dynamically inserting it into the binary, and/or linking in dynamically loaded libraries. In these systems, the analysis code must be of same binary form (including the same ISA) as the original system. The system being analyzed and the analysis code are then run together, and typically it is assumed that they run natively on the target hardware. Because both the original binary and the analysis code are compiled for the same architecture, and then the program and analysis are run together on the architecture for which they are compiled, the execution of the analysis code is very efficient.

Disadvantageously, these systems are inefficient if the binary is to be run under the control of an interpreter. An interpreter is a program that translates and executes another program. The act of interpreting a binary (translating its binary form and executing) occurs in simulators, emulators, run-time systems, and virtual machines. Interpreters are used for various non-limiting reasons, including: (1) the binary is in a different binary form than the native hardware on which it is to be run (called emulation), (2) hardware performance modeling is to be performed using a detailed simulator (called simulation), (3) a generic binary form is used for the purpose of the software being portable across many platforms (run-time system), or (4) the binary is to be interpreted on a virtual machine for security reasons in order to verify that the program is safe and secure to run.

The analysis methods described above are inefficient when run with an interpreter instead of native hardware because both the binary and the analysis code are executed together via the interpreter. They are both compiled to the same binary form, which needs to be interpreted. One goal of the interpreter is to translate from one binary form to another binary form, where the destination binary form is often the hardware's native ISA in order to run the program. If one were to use the above analysis methods directly on an interpreter the analysis code would need to be interpreted along with the original program, and this will significantly slow down the running of the binary. An interpreter can be from 10 times to 1000s (detailed simulator) of times slower than running the program on native hardware. Often times, the analysis code that is inserted into a program can slow it down by a factor of 10 to 100 times even when running on native hardware. Running the analysis code on top of the interpreter will have a multiplicative effect, slowing the whole system by several orders of magnitude. This can make these instrumentation techniques cumbersome or impractical to use on an emulator/simulator.

One way to address this slowdown is to use a dynamic optimizer, also called just-in-time (JIT) compilation. A JIT compiler compiles the original binary, the analysis code, or both dynamically on the fly and caches the compiled regions of code. With a JIT compiler, instead of interpreting each instruction as it executes, groups of instructions are compiled to the native machine ISA and are executed instead. These pieces of code are typically either cached in memory or stored on disk. The use of an interpreter with a JIT compiler significantly improves performance, but still causes further slowdowns. This is because (1) the process of JIT compilation takes time away from execution of the binary to accomplish the compiling, (2) the JIT compiler is typically limited on the types of optimizations it can apply and the amount of knowledge it has about the full source program, so it is not able to generate as efficient code as a static optimizing compiler. In addition, the system being used has to have a JIT system. Not all environments have a JIT system and there is a need for efficient instrumentation of interpreted programs in the absence of a JIT system (without having to build a large complex optimizer).

In addition, if detailed simulation results are needed to perform the analysis and the program is run on an interpreter, the simulation results will be tainted because the simulator is simulating both the original binary and the analysis code, instead of only the instructions from the original binary.

DETAILED DESCRIPTION OF THE EMBODIMENTS OF THE INVENTION

Figure 1:
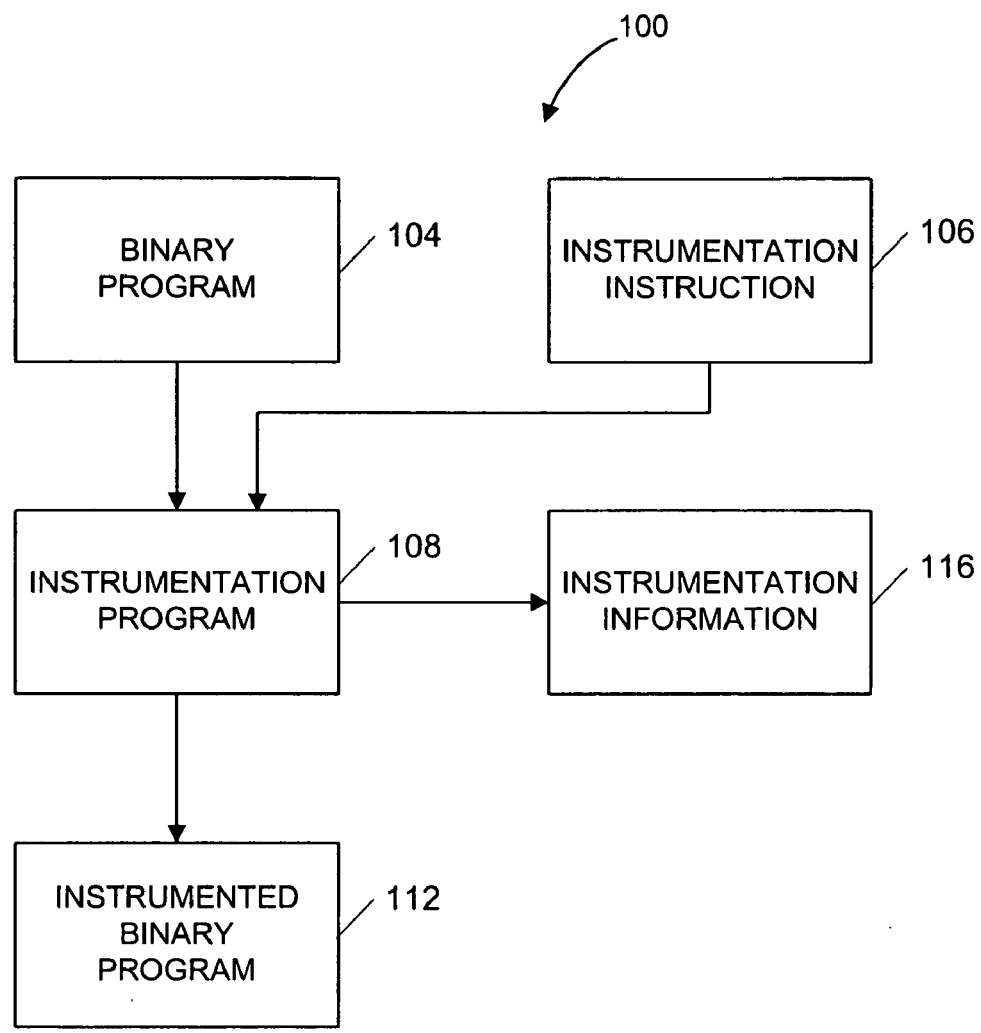
FIG. 1 is an exemplary block diagram illustrating certain components of an analysis system for creating an instrumented binary program.

The following detailed description is directed to certain specific embodiments of the invention. However, the invention can be embodied in a multitude of different ways as defined and covered by the claims. In this description, reference is made to the drawings wherein like parts are designated with like numerals throughout.

One embodiment of the present invention provides a program analysis framework for analyzing the state and other characteristics of a program during its execution as it is being run under control of an "interpreter." An interpreter is used to translate a binary program such that it can execute in a given environment. As is know in the industry, a binary program is an executable item of software that comprises executable instructions.

There are many reasons for running a program under an interpreter. First, for example, for software development it may be more convenient or efficient to run the program on a different architecture than the native architecture (e.g., a desktop machine instead of an embedded processor). Desktop personal computers (e.g., high performance x86 machines) are very fast and inexpensive and are the main method for most people to perform daily computing tasks. This makes them attractive for also performing software development for processors different from the desktop personal computer. This is called cross-platform development because one is developing software for a binary form that is different from the processor in the develop environment, i.e., it has machine instructions that are targeted for a different type of processor. For example, on an x86 machine (the architecture of many desktop computers), it is possible to develop software for embedded processors like ARM, SH3, PowerPC, MIPS, etc. Without the use of the interpreter, the software developed for an embedded processor would not operate on an x86 machine.

In one embodiment of the invention, there are two development phases. During the first phase, developers perform cross-platform development and test, tune and debug their software on a desktop machine. During the second phase, the developers download their software to the embedded processor for final testing. Significant reductions in time to market can be made by performing as much of the development, testing, tuning and debugging on the desktop machine under control of an interpreter.

Second, another reason programs are interpreted is to allow software to be run on multiple ISAs often on what is called a run-time system or virtual machine. A program may be compiled into a portable binary form. The program is then interpreted during emulation, and then dynamically compiled, Just-In-Time compiled, or dynamically optimized.

Third, for security, a program may be run on top of a virtual machine to check the integrity and correctness of a program. When running on the virtual machine or run-time system, the program is interpreted and the program's instructions and structures are analyzed for security related issues.

Fourth, the developer may want to obtain detailed statistics about a program's performance and need to run it on a simulator in order to gather those statistics (e.g., IPC, execution time, memory usage, cache miss rates, etc.). When running the program on the simulator, each instruction is interpreted and corresponding simulation steps are taken to model the hardware's execution.

One embodiment of the invention maintains certain analysis code separate from the instrumented binary program to the extent that they can exist in different binary forms. In this embodiment, the interpreter understands what code/instructions represent the original binary and what instructions represents the analysis code, so that the analysis code can be ignored during performance simulations. Furthermore, in this embodiment, the analysis code is compiled to execute directly under the ISA of a hosting computer, which is different than the ISA of the instrumented binary program.

FIG. 1 is a block diagram of one embodiment of an analysis system 100. The system includes a binary program 104 that has been created by a compiler from source code, such as C, C++, Pascal, or Fortran. The analysis system 100 also comprises an instrumentation program 108. The instrumentation program 108 receives as input the binary 104 and the instrumentation instructions 106 to create an instrumented binary program 112 and instrumentation information 116. As will be discussed below, in one embodiment of the invention, instrumentation information 116 and/or code is added to the instrumented binary program 112. In another embodiment of the invention, the instrumented binary program 112 is not modified with respect to the binary program 104; however, a file containing instrumentation information is created that identifies certain locations in the instrumented binary program 112 that are to be analysis triggers. A trigger is used to determine during interpretation when analysis code is to be exercised.

Figure 2:
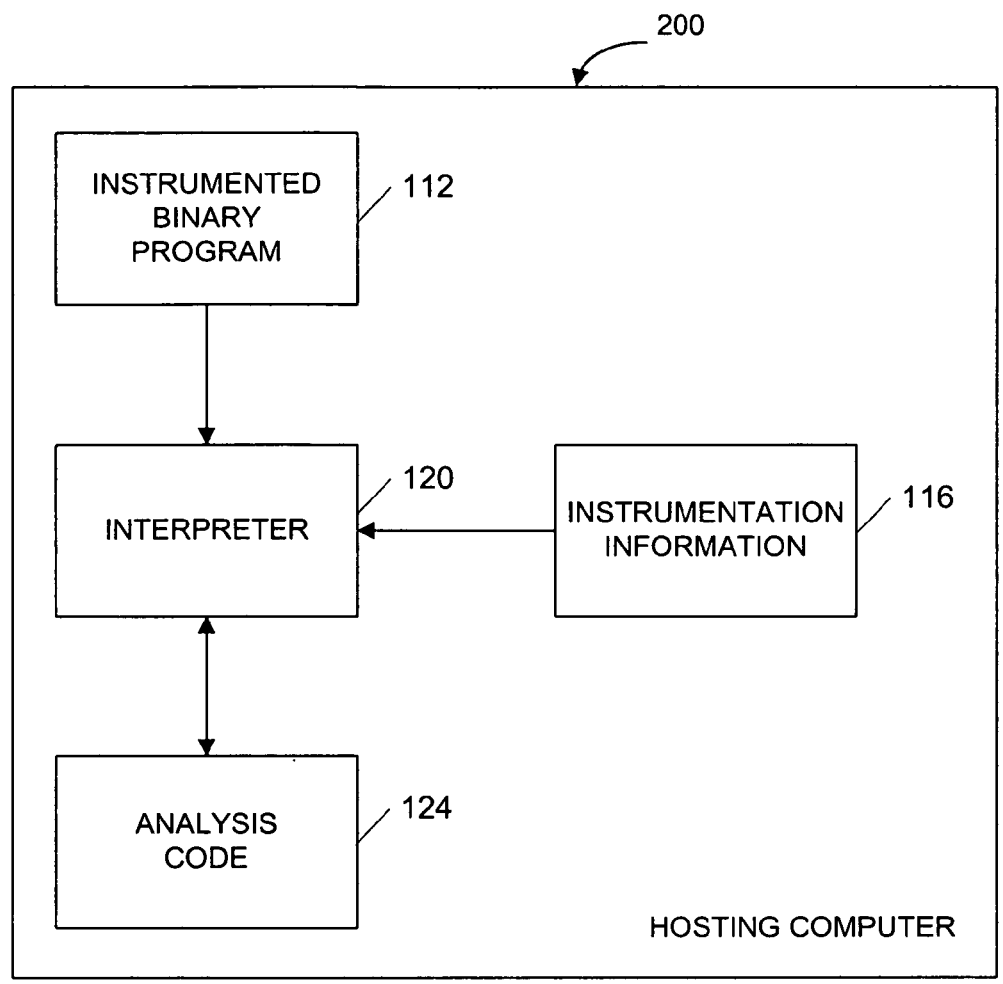
FIG. 2 is an exemplary block diagram illustrating a hosting computer that is used to analyze the instrumented binary of FIG. 1.

FIG. 2 illustrates one embodiment of a hosting computer 200. The hosting computer may be any type of computing device such as a desktop computer having an x86 instruction set. The hosting computer 200 comprises of the instrumented binary program 112 and the interpreter 120. The interpreter 120 is a program that translates and executes another program, such as the instrumented binary program 112. The act of interpreting a binary (translating its binary form and executing) occurs in simulators, emulators, run-time systems, and virtual machines. Reasons why the binary program 112 may be interpreted include: (1) it is in a different binary form than the native hardware on which it is to be run (called emulation), (2) hardware performance modeling is to be performed using a detailed simulator (called simulation), (3) a generic binary form is used for the purpose of the software being portable across many platforms (run-time system), or (4) the binary form is to be interpreted on a virtual machine for security reasons in order to verify that the program is safe and secure to run, as well as other reasons. To analyze a system in such an environment, a mechanism, called a trigger, is used to indicate points in the program at source, intermediate, or binary form level showing where information about the system is to be tracked/profiled/analyzed. Once these analysis points are determined, triggers are created in a separate file, such as instrumentation information 116, or inserted via program instrumentation into the binary form to indicate to the interpreter 120 when the analysis triggers need to be processed. This system can guarantee that the analysis code will see the same behavior in terms of correctness, addresses, and data values after instrumentation as the system did before.

In one embodiment, when one of these triggers occurs during execution, the interpreter 120 calls analysis code 124 passing it the appropriate information so that it may track statistics, metrics, and information about the system corresponding to the trigger. In another embodiment, one of these triggers occurs during execution, interpreter 120 calls analysis code 124 passing it what trigger fired. Then the interpreter 120 provides a callback interface/API for allowing the analysis code 124 to query the state of the instrumented binary program 112 and the state of the runtime environment, e.g., register values, of the instrumented binary program 112. The callback interface/API allows the analysis code 124 to create the parameter values that may be needed to execute analysis routines. In another embodiment, the interpreter 120 notifies the analysis code 124 upon execution of each instruction, and an analysis controller determines when a trigger is fired, and calls the analysis routines.

It is noted that the functions, as described herein, that could be performed by the interpreter could be directly performed by an emulator, simulator, run-time system, virtual machine, other hardware or software device, or combination thereof. In one embodiment of the invention, the instrumentation program 108 is integrated with the compiler that is used to create the binary 104, and the output of this compiler can directly produce the instrumented binary 112. In another embodiment of the invention, the compiler and the instrumentation program 108 are separate executables. Furthermore, in yet another embodiment of the invention, the instrumentation program 108, the interpreter 120, and the compiler (not shown), or selected components thereof, are integrated together to form a single program package.

Program analysis is used to understand the running behavior of a program, performance tuning, debugging, testing, and to understand the hardware behavior it is running upon. To perform program analysis a trigger is used to represent what in the program is to be analyzed. When the trigger occurs during the running of a program, a trigger dispatcher needs to form parameters that can be used in the native binary form, it then calls the corresponding analysis code passing to it the information it needs in order to perform its analysis.

In one embodiment, if the trigger information is to be stored in the instrumented binary program 112, there are two different methods for accomplishing this—static or dynamic patching. Furthermore, combinations of these approaches may be used wherein static patching is used for items that are easily determined statically, and dynamic patching is used for items that are best handled at run-time when more information is accessible.

Patching a binary for analysis can include adding, removing and modifying instructions in the binary program to insert the triggers. Static patching is performed on a binary before it is run producing a new binary, with the triggers added. Dynamic patching modifies the code during execution instead of off-line before execution. This approach examines the code as it executes to determine if a trigger should be added. If so, it dynamically adds the triggers to the binary form. To perform full and accurate patching statically, symbol information is often needed to completely understand the static binary form. Even then, there may be some things like dynamically loaded libraries that cannot be determined until the program is executed. For these issues, dynamic patching may be preferred. One advantage of performing dynamic patching is that symbol information is not needed, and that the patching is done incrementally as the program executes.

For convenience of description, set forth below is a description of how static patching is used to add triggers for analysis code. Dynamic patching performs the exact same techniques, except it occurs while running the execution of the binary program. Whenever an unpatched region is seen, it is patched dynamically, and then execution continues.

Figure 3:
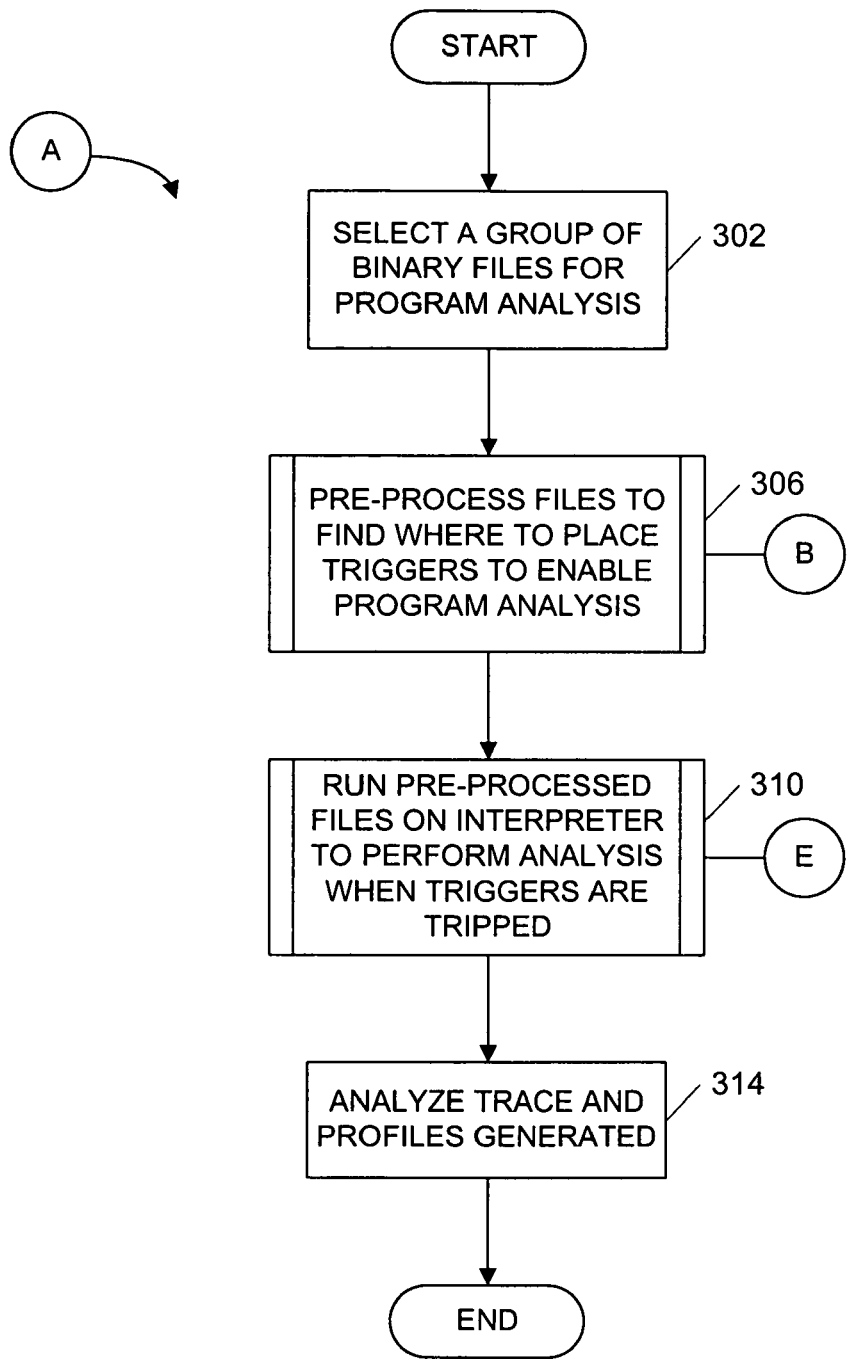
FIG. 3 is an exemplary flowchart illustrating a process for generating and analyzing the instrumented binary program of FIG. 1.

FIG. 3 is a flowchart illustrating a process for statically patching the binary program 104 of FIG. 1. Depending on the embodiment, additional steps may be added, others removed, and the sequence of the steps rearranged. Starting at a step 302, a set of binary files is chosen by a developer and instrumentation instructions are provided with respect thereto All of the dynamic libraries that can be called from the binary programs of interest are determined, and, in one embodiment, are added to the binary list of files to be analyzed.

Figure 4:
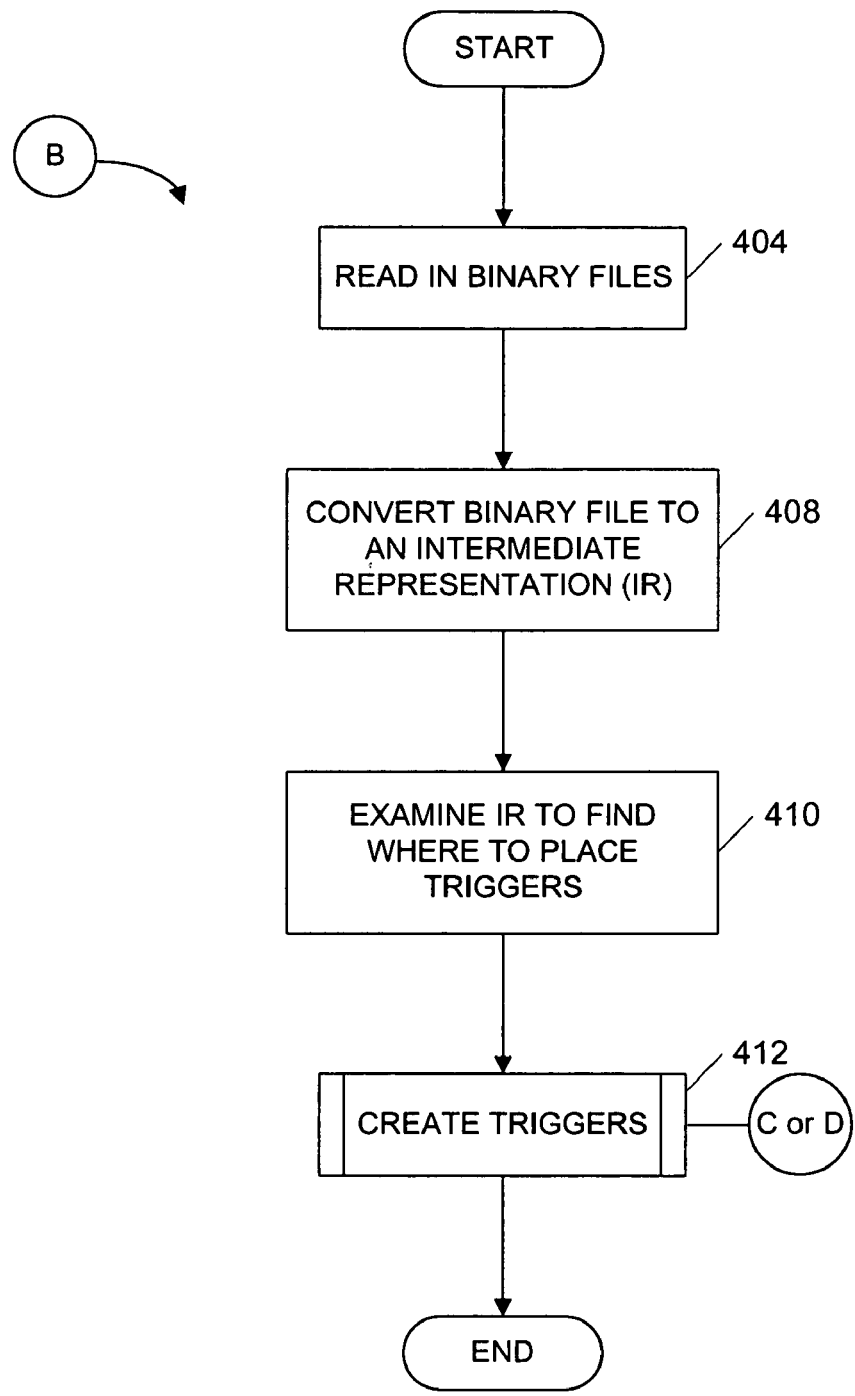
FIG. 4 is an exemplary flowchart illustrating a process for identifying triggers for the binary program of FIG. 1.
Figure 5:
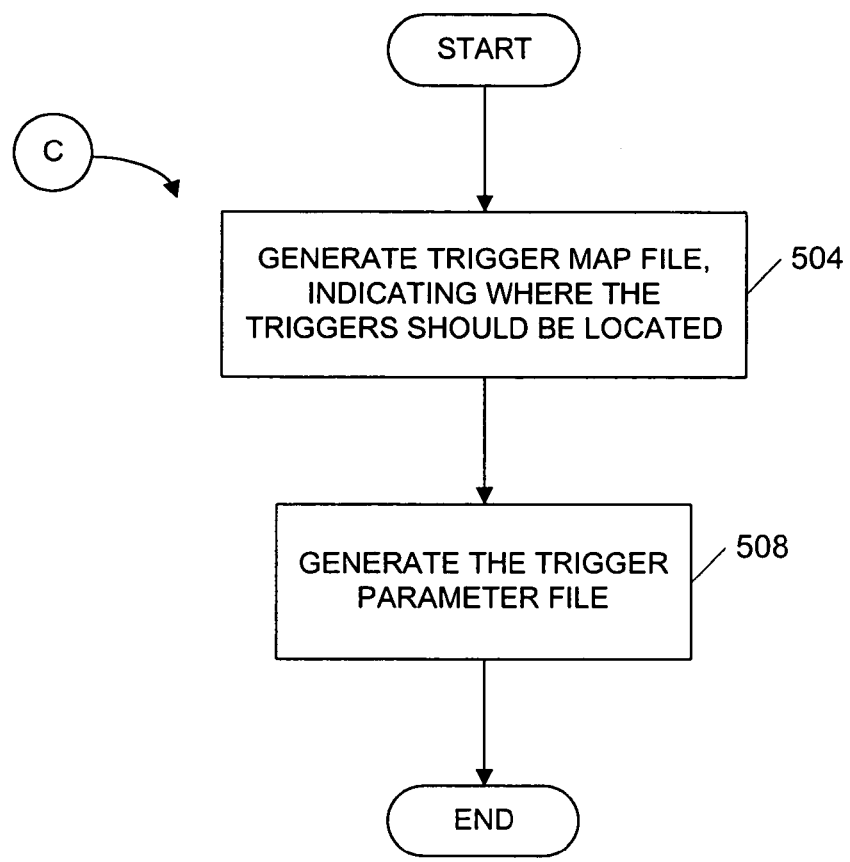
FIG. 5 is a exemplary flowchart illustrating a process illustrating in further detail certain aspects of generating trigger information shown in FIG. 4.
Figure 6:
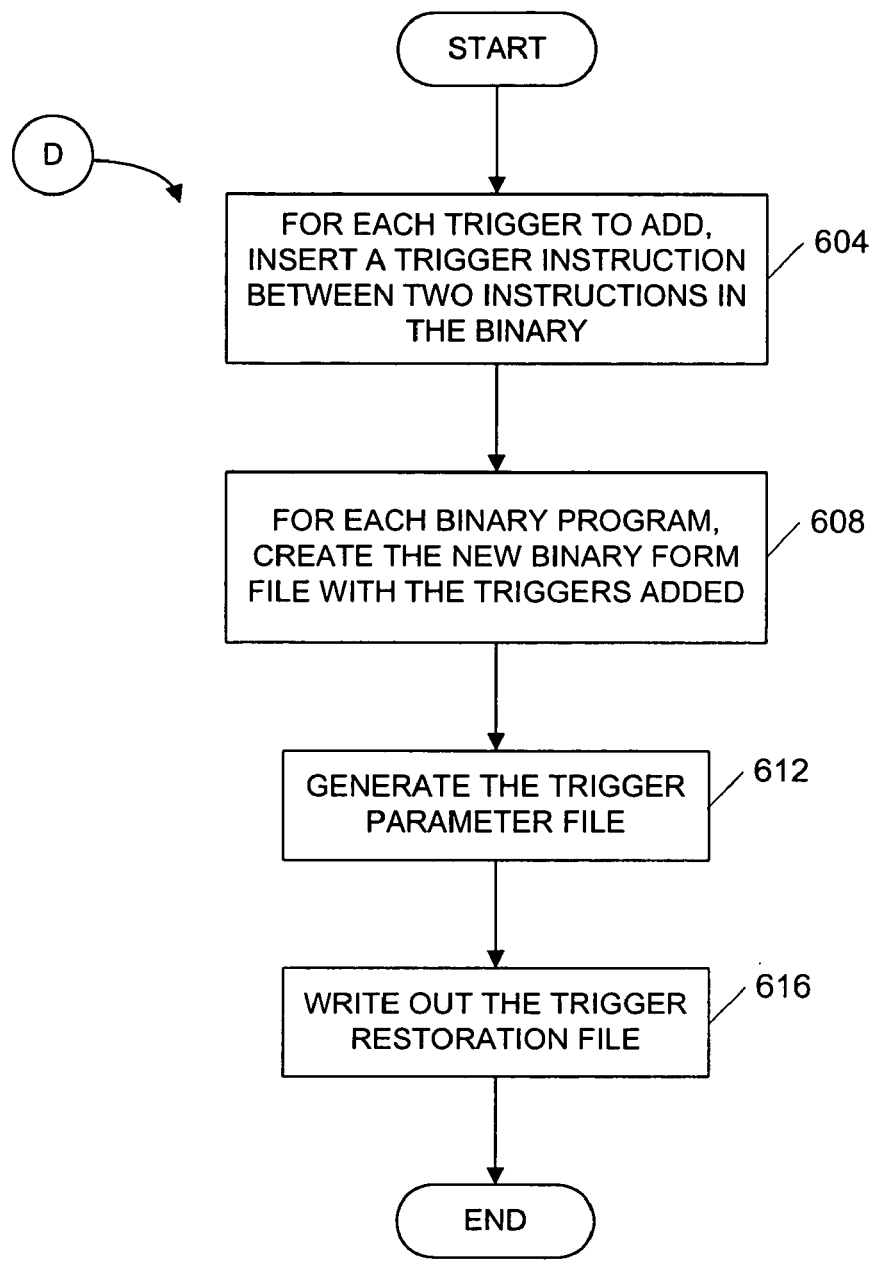
FIG. 6 is an exemplary flowchart illustrating a process for modifying a binary program to include trigger information.

Next, at a step 306, these files are preprocessed by the instrumentation program 108 so as to identify and create certain triggers. After this step, the binary files can be considered "instrumented." As will be discussed further below, in one embodiment, the instructions define each location in the binary program that is of interest to the developer. In one embodiment of the invention, a graphical user interface is provided to the user so that the developer can view the source code for the binary program. Using the graphical user interface, the developer can select certain instructions as being of interest and for these instructions to be trigger locations in the corresponding portion of the corresponding object. In another embodiment of the invention, a program is generated so as to automatically traverse the binary program so as to identify appropriate triggers. Set forth below with reference to FIGS. 5 and 6 is an exemplary description for one embodiment of the invention of how these trigger locations are recorded. It is noted that process of instrumentation does not require the modification of the binary program; instrumentation information can be stored outside of the binary program. FIG. 4 illustrates an exemplary process for pre-processing the binaries to add instrumentation information.

Moving to a step 310, the instrumented binaries 112 are then run in the interpreted environment, with tripped triggers resulting in an analysis call to analysis code 124. Since the analysis code is a native binary, it is run natively without any interpretation. Continuing to a step 314, the analysis results can be stored on a mass storage device or some other location on a network or communicated to another program.

FIG. 4 illustrates an exemplary process of statically pre-processing the binary files. FIG. 4 illustrates in further detail certain steps that occur in one embodiment of the invention with respect to step 306 of FIG. 3. Depending on the embodiment, additional steps may be added, others removed, and the sequence of the steps rearranged. Starting at a step 404, the binary files are read in by the instrumentation program 108. Next, at a step 408, they are then converted to an intermediate representation (IR). The IR provides a form for a user to traverse over the instructions and control flow of the static binary. Continuing to a step 412, the user can then write a program to traverse over the IR to automatically determine where they want to add triggers. In one embodiment of the invention, an instrumentation .dll having an instrumentation API is provided to users so as to facilitate the automatic instrumentation of a binary program. It is noted that the analysis code can be developed either before or after the binary to be analyzed is developed. In another embodiment of the invention, a software utility is provided to the user such that they can designate the trigger points in the intermediate representation using a graphical user interface. Moving to a step 412, once all of these places are determined, the triggers are created by the instrumentation program 108. Set forth below with reference to FIGS. 5 and 6 is an exemplary description for one embodiment of the invention of how these trigger locations are identified.

FIG. 5 is a flowchart illustrating an exemplary process of creating the instrumentation information 116. In one embodiment of the invention, the instrumentation information 116 includes at least three files: a trigger map file, a trigger parameter file, and a trigger restoration file. In one embodiment, this information is used by the interpreter 120 to help define/locate the triggers in the instrumented binary program 112.

A trigger is used to identify during interpretation that an analysis call should be performed. In one embodiment, the interpreter 120 identifies triggers during run-time by analyzing trigger information 116 stored in a file (see FIG. 5), or by identifying trigger information added to the binary program in 112.

Many different representations can be used to identify a trigger during the program's execution. The following is an example list. With respect to the embodiment of the invention shown in FIG. 5, this information may be stored in a trigger map file, e.g., instrumentation information 116 (FIG. 2). With respect to the embodiment of the invention shown in FIG. 6, this information may be encoded into the binary or part of it in a trigger map file and part of it in the binary program itself. One function of the trigger is to identify some interesting behavior in the program that needs to be tracked or analyzed. The trigger and the information that needs to be passed to the analysis code can take many forms.

Starting at a step 504, a trigger map file is created. In one embodiment of the invention, the trigger map file specifies all the instrumented triggers in the instrumented binary program 112. The following is an exemplary and non-limiting list of triggers:

(1) the use of a no-op instruction, which permits unencumbered native execution;
(2) an individual instruction PC—perform trigger when a specific instruction PC occurs when running;
(3) a group of instruction PCs in a binary;
(4) an instruction type—each time a specific type of instruction occurs during running perform the trigger, e.g., one could use the ARM Co-processor CDP instruction. When this instruction is seen with the corresponding co-processor number (ID), this signals to the interpreter 120 that a trigger instruction has been encountered);
(5) a given type of register used or register names—identify a trigger by the way register names are allocated, or the registers are being used;
(6) control flow path in a binary—the trigger trips (occurs) when a given control flow path occurs during the program's run;
(7) a value-based event—a value is a assigned to a given register, set of registers, memory value, or set of memory values which then causes the trigger to trip making the analysis code to be invoked;
(8) a time-based event—turn the trigger checking on corresponding to one of the above items after a given amount of time has passed by (cycles, time, and instructions); and
(9) an occurrence-based sampling event—perform the trigger after N times the event has occurred, and perform the trigger for M times for each event after that.

An instruction-based trigger can be configured to be activated before or after an instruction's execution. In one embodiment, if "before" or "after" is not specified by the instrumentation instructions 106, "before" is the default behavior. It is noted that the above-triggers could also be logical or programmable combinations of the above items.

Next, at a step 508, the trigger parameter file is created. The trigger parameter file stores the parameters that represent what information needs to be passed to the analysis code. Each entry in the trigger parameter file represents the parameters for a given type of trigger and analysis call. Each entry then contains a parameter list. For each parameter in the list, a syntax tree is stored that represents how to calculate the parameter. The syntax tree is a known compiler based structure where the leafs of the tree represent the data values to start with at run-time and the internal nodes of the tree mathematical functions used to calculate the final parameter. The data values to be used are based on the type of information to be communicated to the analysis code. For analysis, upon the occurrence of a selected trigger, the analysis code 124 is provided with one or more of the following items where relevant: (1) constants (e.g., arbitrary values to represent something, procedure names, instruction grouping IDs); (2) register values; (3) data/memory values; (4) program counter addresses; (5) effective addresses; (6) branch directions; (7) numeric constants; (8) strings; (9) instruction bits; (10) operation codes; (11) register numbers; (12) hardware metrics; and (13) additional instruction information.

In one embodiment, some instructions in the instrumented binary program 112 will be marked as not to be interpreted. These instructions may have been inserted into the binary during the instrumentation process, but they should not be there for the correct execution of the binary. If the instrumented binary program 112 is modified to include these types of instructions, it can be run on a native processor without interpretation. It is noted that in one embodiment of the invention, if instrumentation instructions are added to the binary program, these instructions are no-ops.

FIG. 5 shows the process of storing all of the trigger information in a file and not modifying the binaries with this information. In this approach, all the information that may be needed to dynamically identify a trigger during the execution of a program is written to a file. This information may include how to identify a trigger (the trigger map). As part of this process, in addition to generating the trigger map, the trigger parameter file is also generated. The trigger parameter file contains all the information needed to create the parameter for each trigger and what analysis routine to call for the trigger.

Referring now to FIG. 6, an alternative to having the trigger files is to store some or all of the trigger information in the binary itself. FIG. 6 illustrates an exemplary embodiment where certain trigger information is inserted into the instrumented binary program 112. Depending on the embodiment, additional steps may be added, others removed, and the sequence of the steps rearranged. Using the method depicted on FIG. 6, a trigger map file may not be needed. This is because if all of the trigger instructions are inserted into the instrumented binary program 112 using static binary patching, then all the information needed by the interpreter 120 is inside the binary program. Moreover, the trigger restoration file is also generated, if needed for the current environment. This trigger restoration file contains all of the information to tell the interpreter (a) which instructions in the binary form are to be ignored during interpretation, (b) which instructions are to be ignored during detailed simulation, and (c) which instructions in the binary program need to be replaced/substituted with different instructions. For item (c), an instruction or sets of instructions in the patched binary are to be ignored during simulation, and instead different instruction or set of instructions (contained in the restoration file) are to be executed. These restored instructions may be from the original program, and the reason why they need to be restored is that the version in the patched binary have been distorted, and in order to not have any perturbation, they need to be used instead of the patched instructions during detailed simulation. Note, the trigger restoration file need not be used if simulation analysis is not to be performed (e.g., it is just performing interpretation). In this embodiment, a trigger parameter file and a trigger restoration file may be used as described above. In another embodiment one to all three of these files maybe included as "data" in the instrumented binary and stored in the instrumented binary. In this way the instrumented binary contains all of the information to perform our interpretation with analysis in one file.

Note, if trigger instructions are inserted into the binary, then it may be beneficial to choose a trigger that will also allow the binary program to be run in its native environment, e.g., an ARM-based board. This allows the instrumented binary to be used in the native environment for deployment or testing, and then use the same binary in a rehosted environment to gather profile information.

Starting at a step 604, the instrumentation program 108 inserts one to several instructions between 2 instructions in the binary program 104 for each trigger identified by the user. This may require even moving the original instructions to a new location in the binary. This is a fairly well known process called binary instrumentation. Next, at a step 608, for each binary program, a new file is created having inserted triggers. Continuing to a step 612, the trigger parameter file is created as discussed above with respect to step 508 of FIG. 5. Continuing to a step 616, the trigger restoration file is created in a process such as described above.

Figure 7:
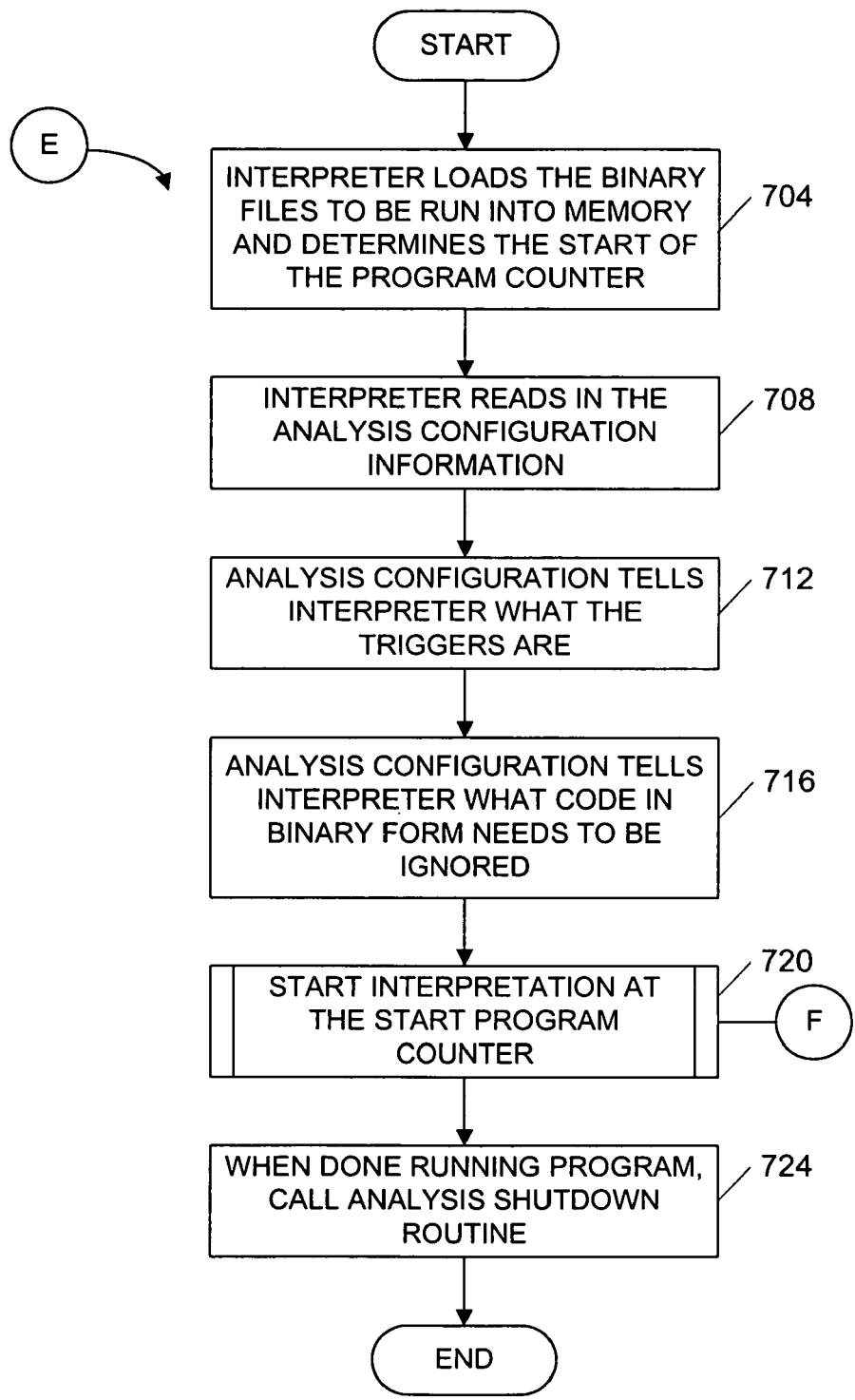
FIG. 7 is an exemplary flowchart illustrating a process for interpreting the instrumented binary program of FIG. 1.

FIG. 7 is a flowchart illustrating an exemplary process for interpreting the instrumented binary program 112. Depending on the embodiment, additional steps may be added, others removed, and the sequence of the steps rearranged. Starting at a step 704, the interpreter 120 loads the instrumented binary program 112 into memory and determines the start of the program counter. At this step, the interpreter 120 may load all or a subset of the binary files to be run into memory.

Next, at a step 708, in one embodiment, the interpreter 120 receives configuration information from the analysis code 124. In one embodiment of the invention, the interpreter 120 invokes an initialization routine that is identified by the analysis code 124 via a predefined analysis code API. The analysis code API allows the analysis code 124 and the interpreter 120 to be developed by different entities and to communicate with each other via this predefined API interface. In one embodiment, the interpreter 120 is built as a dynamic link library (.dll) that can be linked with by the analysis code 124. In another embodiment, the analysis code 124 is built as a .dll that can be linked with the interpreter. In another embodiment, the interpreter 120 reads in only certain information that is used to identify a trigger; however, the interpreter 120 does not read in other information such as the trigger parameter file and the trigger restoration file. In yet another embodiment, instead of reading the information that is stored in the parameter map file from a file, this information is provided by the analysis code 124 during initialization of the analysis code 124 by the interpreter 120.

It is noted that in one embodiment, in lieu of performing steps 708-716, the interpreter notifies the analysis code 124 upon interpretation of each instruction in the instrumented binary program and the analysis code 124 determines whether or not to request further information from the interpreter 120 regarding the state of the instrumented binary program 112 or the runtime environment. Thus, the analysis code 124 makes the determination of which instructions are triggers.

Continuing to a step 712, the initialization routine provides to the interpreter 120 the trigger map file, trigger parameter file, and the trigger restoration file, or, alternatively, the data is taken from the binary itself. If trigger information is stored in the instrumented program binary 112, the analysis code 124 locates this information. Even if the information in these files is not passed via the binary, additional information may be passed in via the binary such as how to identify a trigger, where the three files are located on disk, etc.

Proceeding to a step 716, in one embodiment, the analysis code 124 informs the interpreter 120 which machine instructions in the instrumented binary program 112 should be ignored. As discussed above, in one embodiment, this information is stored in the trigger restoration file.

Next, at a step 720, the interpreter 120 begins to interpret instructions starting at the program counter (identified in step 704). The interpreter 120 interprets the machine instructions in the instrumented binary program 120 until execution of the instrumented binary program terminates in due course. An exemplary process of interpreting the instructions in the instrumented binary program 112 is set forth below with reference to FIG. 8. Moving to a step 724, after execution of the program is complete, the interpreter 120 invokes a shutdown routine of the analysis code 120 using the analysis code API.

Figure 8:
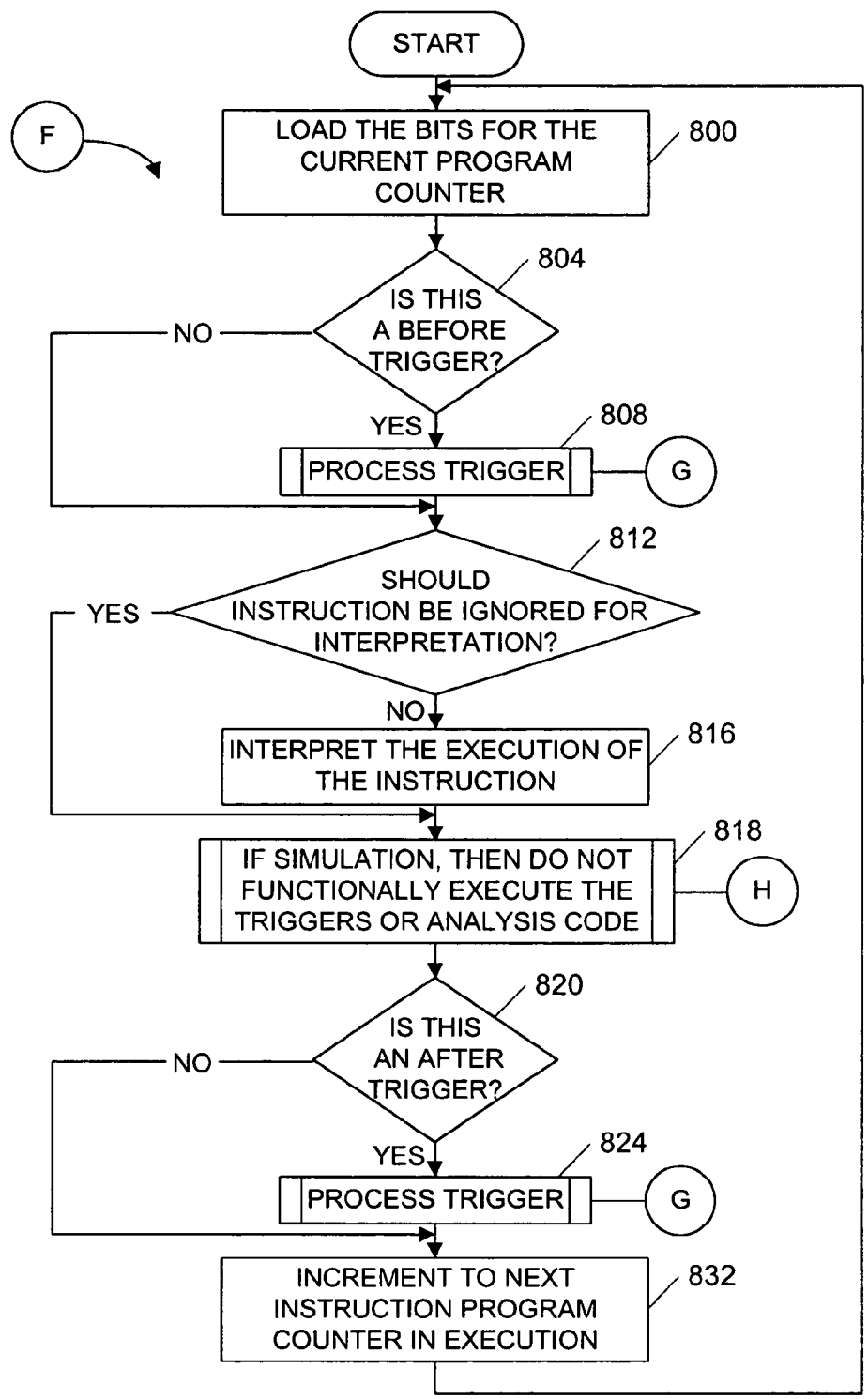
FIG. 8 is an exemplary flowchart illustrating in further detail an exemplary process of performing the interpretation shown in FIG. 7.

FIG. 8 is a flowchart illustrating an exemplary process for interpreting the machine instructions in the instrumented binary program 112 and performing analysis with respect to triggers in the instrumented binary program 112. FIG. 8 illustrates certain steps that occur in one embodiment of the invention with respect to step 720 of FIG. 7. Depending on the embodiment, additional steps may be added, others removed, and the sequence rearranged. In one embodiment of the invention, there are two types of triggers: instruction based and time based. FIG. 8 illustrates an exemplary process for using instruction based triggers.

For an instruction based trigger system, for each machine instruction (it can be less often), the interpreter 120 determines whether a trigger has been found. This can be one of the trigger types listed above (e.g., the type of the instruction, its PC, the current PC and the past PC (edge)). Starting at a step 800, the interpreter 120 loads the bits (machine instructions) for the current program counter. Continuing to a decision step 804, the interpreter 120 determines whether the current instruction is a before trigger, or if there exists a before trigger for the current machine instruction.

If there is a before trigger, process proceeds to a step 808. At this step, the interpreter 120 processes the trigger. An exemplary method for processing a trigger is described below with reference to FIG. 9. It is noted that if a trigger has been encountered, it does not mean that this trigger will necessarily result in an analysis call, since triggers can be conditional. The trigger has to also be tripped. By tripped, it is meant that the trigger will result in an analysis call. Some triggers are defined so that anytime they are executed, they are tripped. These are unconditional triggers. For conditional triggers, the right type of condition has to occur in order for the analysis call to be performed. These conditions can include as non-limiting examples: execution of certain instructions sequence; a given register or memory value or range of values; a predicate value is satisfied; a certain time or instructions has elapsed; and execution is in a certain time or instruction window.

After processing the trigger, or alternatively, if the loaded machine instruction is not a before trigger or has a trigger associated with it (decision step 804), the process proceeds to a decision step 812. At the decision step 812, the interpreter determines whether the loaded machine instruction should be ignored for interpretation. If the machine instruction should not be ignored, the process proceeds to a step 816, where the machine instruction is interpreted. By interpreted, we mean that the instruction is executed updating the execution state (memory and register values) of the instrumented binary's execution.

After step 816, or alternatively, from decision step 812 (if it was determined that the instruction should be ignored for interpretation), the process proceeds to a step 818. At the step 818, it is determined whether the instrumented binary is being executed for simulation purposes. If so, then the analysis code is not simulated. This process is described further below with respect to FIG. 10.

Continuing from step 818, the process proceeds to a decision step 820, wherein the interpreter 120 determines if the machine instruction is an "after" trigger or has an after trigger associated with it, i.e., it is triggered after the execution of the instruction. If there is an "after" trigger, the process proceeds to a step 824 wherein the trigger is processed (see state 808 described above). Moving to a step 832, the interpreter 120 increments to the next machine instruction and then repeats the process described above.

Figure 9:
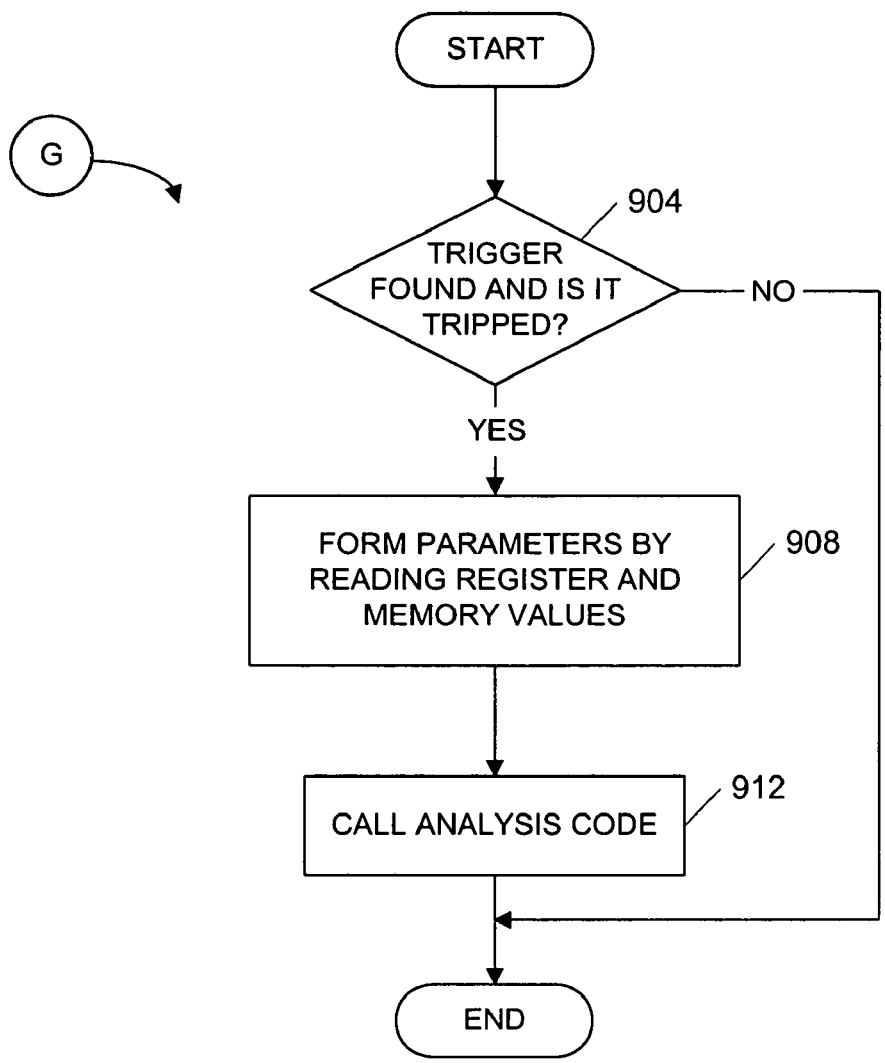
FIG. 9 is a flowchart illustrating a process for invoking analysis code in response to encountering a trigger in the binary program.

FIG. 9 is a flowchart describing an exemplary process for processing a trigger. Depending on the embodiment, additional steps may be added, others removed, and the ordering of the steps rearranged. In one embodiment, FIG. 9 is performed by a dispatcher in the analysis code. In another embodiment, FIG. 9 is performed by the interpreter. Starting at a step 904, it is determined whether a trigger has been "tripped." Exemplary types of triggers are described above. If the trigger has been tripped, the process proceeds to a step 908. At this step, the parameters need to be formed for transmission to the analysis code 124. To form the parameters, the syntax tree described above is populated to retrieve relevant program information such as register values, program counters, and instruction encodings. In one embodiment of the invention, the types of information that is to be provided by the interpreter 120 is defined by analysis code 124. This information is communicated to the interpreter via a predetermined API. In another embodiment of the invention, this information is stored in the instrumented binary program 124. In yet another embodiment of the invention, this information is predefined and integrated into the interpreter 120. Continuing to a step 912, these parameters are packaged into the appropriate interface storage and sent to the analysis code 124. After the analysis call is performed, the instruction that tripped the trigger is functionally executed via interpretation.

Figure 10:
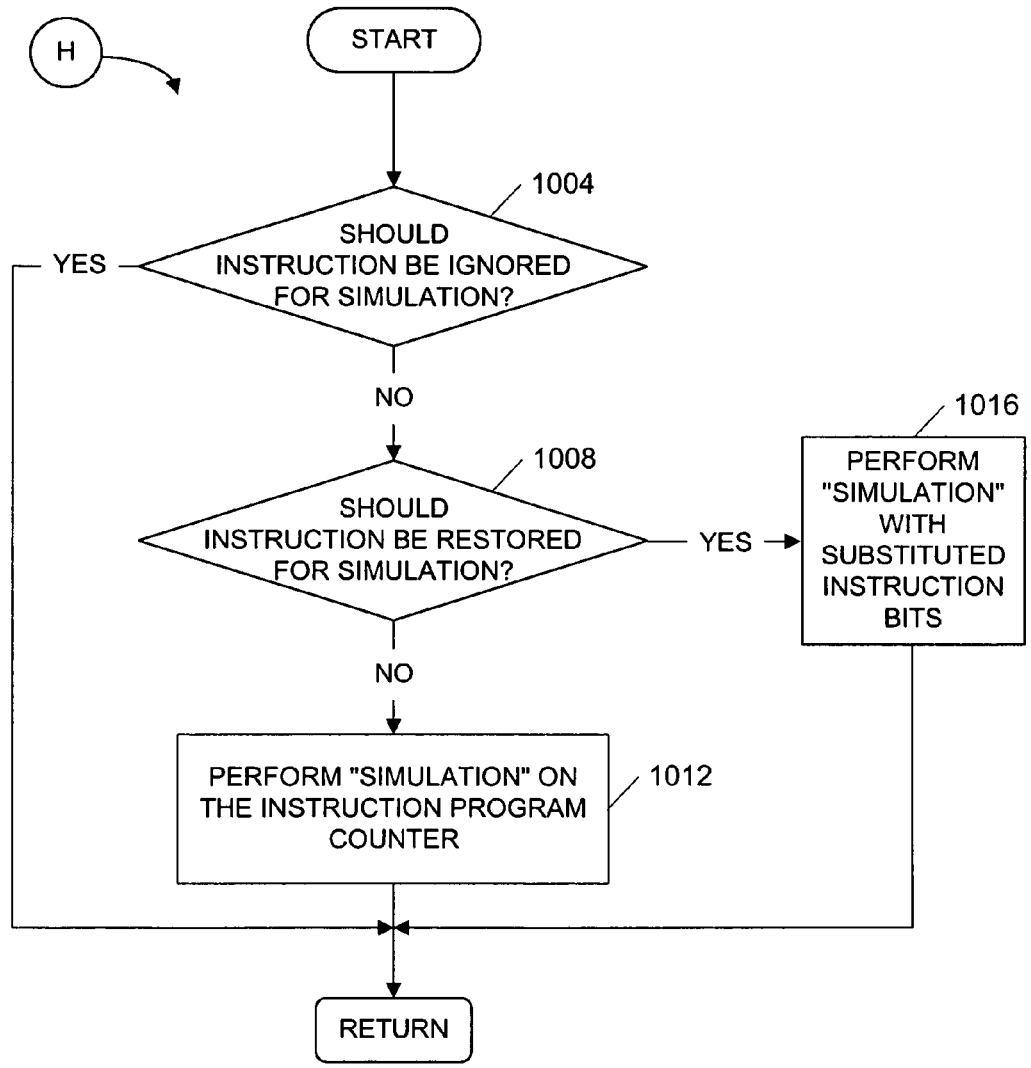
FIG. 10 is a flowchart illustrating a process for ignoring certain instructions in the instrumented binary program of FIG. 1.

FIG. 10 is a flowchart illustrating an exemplary process for ignoring selected machine instructions in the instrumented binary program 112. These steps may be used, for example, if a detailed simulator is used to gather performance, or hardware metrics. Depending on the embodiment, additional steps may be added, others removed, and the sequence of the steps rearranged.

In one embodiment, if the interpreter 120 is used only for emulation/functional execution, then the steps of FIG. 10 may need not be performed. But for detailed simulation, two steps occur that guarantee that the interpreter 120 does not perturb or distort of the program's execution statistics. This means that the hardware metrics produced would be the same with the analysis code 124 as it was before without the analysis code 124. There are two cases. The first is that the instruction should just be ignored. This was an instruction that was added to the original binary in order to enable the correct execution of the triggers and its patching. Since the instruction was not in the original program's execution, it should just not be part of the detailed simulation. The other case is when original instructions in the binary have been modified in order to enable correct binary form execution with triggers. Instead of simulating the modified versions of these instructions, the original instruction bits may be read from the trigger restoration file or the original binary file and those instructions are used instead. This guarantees they have the same register dependencies as before, since some of the instructions have been ignored, and the correct register values will be read and updated.

Starting at a step 1004, it is determined whether the instruction should be ignored, such as for example if the instrumented binary code 124 is to be subject to simulation. If the machine instruction is to be ignored, the process ends, and the interpreter 120 selects the next machine instruction in the program.

Referring again to the decision step 1004, if the instruction should not be ignored, the process proceeds to a step 1008, where it is determined whether the instruction should be "restored" for simulation. If it is determined that instructions should be restored, the process proceeds to a step 1016 for this restoration, and the instrumented binary code 124 is modified to its pre-instrumented form. Otherwise, if instructions are not to be reformed (step 1012), the interpreter 120 interprets the machine instruction in its current form.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. An analysis method, comprising:

identifying at least one construct in a program, wherein the program comprises native instructions for execution on a first processor having a first machine instruction set;

assigning at least one native instruction of the program proximate the construct to be a trigger to invoke analysis code;

generating a trigger map file that stores information specifying instrumented triggers in the program including the assigned trigger and further stores information indicative of the assigned native instruction of the assigned trigger;

generating a trigger parameter file that stores information for providing parameter information for the specified triggers in the program and further stores information for determining analysis code to be invoked in response to the trigger; and interpreting by using the information stored in the trigger map file and the information stored in the trigger parameter file, via an interpreter, the program on a second processor having a second machine instruction set;

during the interpretation and upon interpreting the assigned native instruction, identifying the assigned native instruction as the trigger; and invoking the analysis code by the interpreter at the identified construct in response to identifying the trigger wherein the analysis code includes machine instructions of the second machine instruction set for execution directly on the second processor, and wherein the analysis code and the interpreter communicate via a predefined interface.

2. The method of claim 1, wherein the construct is selected from the group comprising: a basic block of native instructions, a specified native instruction, a group of native instructions, and a native procedure.

3. The method of claim 1, wherein during the identification of a construct, the trigger is created and information about the trigger is stored in a file for usage by the interpreter.

4. The method of claim 1, wherein during the identification of a construct, the trigger is created and information about the trigger is stored in the program.

5. The method of claim 1, wherein the predefined interface includes a registration procedure for the analysis code to register with the interpreter.

6. The method of claim 1, wherein invoking the analysis code consists of providing to the analysis code at least one item selected from the group comprising: a null statement, a register value, a memory value, a program counter address, branch instructions, and an effective address.

7. The method of claim 1, additionally comprising registering the analysis code with the interpreter via a predefined application programming interface.

8. The method of claim 1, wherein interpretation comprises emulation.

9. The method of claim 1, wherein interpretation comprises simulation.

10. The method of claim 1, wherein the native trigger instruction comprises at least one machine instruction that does not substantially affect the performance of the program.

11. The method of claim 10, wherein the native trigger instruction comprises at least one no-op instruction of the first machine instruction set.

12. A method, comprising:
storing a compiled analysis binary program, wherein the analysis binary program includes machine instructions from a first machine instruction set, and wherein the analysis binary program is configured to analyze or trace state information of an interpretable program, wherein the interpretable program comprise native machine instructions of a second machine instruction set;
assigning at least one native instruction of the interpretable program proximate a selected construct to be a trigger to invoke the analysis binary program;
generating a trigger map file that stores information specifying instrumented triggers in the program including the assigned trigger and further stores information indicative of the assigned native instruction of the assigned trigger;
generating a trigger parameter file that stores information for providing parameter information for the specified triggers in the program and further stores information for determining analysis code to be invoked in response to the trigger; and
interpreting by using the information stored in the trigger map file and the information stored in the trigger parameter file, via an interpreter comprising machine instructions from the first machine instruction set and executing on a processor configured to execute the first machine instruction set, the interpretable program, and
during the interpreting, upon encountering the assigned native instruction proximal a selected construct in the interpretable program, identifying the assigned native instruct as the trigger and invoking the analysis binary program by the interpreter and providing at least one item of state information about the execution of the interpretable program in response to identifying the trigger.

13. The method of claim 12, wherein the state information includes register values, parameter values, instruction addresses, or data addresses.

14. The method of claim 12, wherein the second machine instruction set includes generic machine instructions that are configured to be emulated on heterogeneous hardware platforms.

15. The method of claim 12, wherein the construct comprises a procedure.

16. The method of claim 12, wherein the construct comprises an instruction.

17. The method of claim 12, wherein the interpretable program is a binary program configured for direct execution on a second processor.

18. The method of claim 12, additionally comprising:
storing location information about the selected construct in a file; and
using the file during the interpretation so as to identify the selected construct.

19. The method of claim 12, additionally comprising inserting a the native trigger instruction proximate to the selected construct.

20. The method of 19, wherein the inserted trigger instruction is a machine instruction that does not substantially affect the performance of the interpretable program.

21. The method of 19, wherein the inserted trigger instruction is a no-op machine instruction.

22. The method of claim 12, wherein interpretation comprises emulation.

23. The method of claim 12, wherein interpretation comprises simulation.

24. The method of claim 12, additionally comprising ignoring selected machine interactions in the interpretable program.

25. An analysis system, comprising:
a storage for storing an analysis binary code, wherein the analysis binary code includes machine instructions from a first machine instruction set, and wherein the binary code is configured to analyze or trace state information of an interpretable program; and
a processor configured to execute an interpreter program for interpreting the interpretable program, wherein the interpretable program includes machine instructions from a second machine instruction set,
wherein the processor is configured to execute machine instructions from the first machine instruction set, and
wherein the processor is configured to:
receive an assignment of at least one native instruction proximate a selected construct of the interpretable program to be a trigger to invoke the analysis binary code;
generate a triggers map file that stores information specifying instrumented triggers in the program including the assigned trigger and further stores information indicative of the assigned native instruction of the assigned trigger;
generate a trigger parameter file that stores information for providing parameter information for the specified triggers in the program and further stores information for determining analysis code to be invoked in response to the trigger,
wherein the interpreter program is configured to interpret the program by using the information stored in the trigger map file and the information stored in the trigger parameter file,
and during the interpreting, upon encountering and interpreting the assigned native instruction, the processor is configured to identify the assigned native instruction as the trigger and conditionally invoke the binary code and provide at least one item of state information about the execution of the program in response to identifying the trigger.

26. The system of claim 25, wherein the second machine instruction set includes generic machine instructions that configured to be capable of being emulated on heterogeneous hardware platforms.

27. The system of claim 25, additionally comprising:
a second storage configured to store information about the selected construct in a file; and
wherein the processor is further configured to use the file during the interpretation of the interpretable program so as to identify the selected construct.

28. The system of claim 25, wherein the processor is further configured to insert the trigger instruction proximate to the selected construct.

29. The system of claim 28, wherein interpretation comprises emulation.

30. The system of claim 28, wherein interpretation comprises simulation.

31. The system of claim 25, wherein the native trigger instruction comprises at least one machine instruction that does not substantially affect the performance of the interpretable.

32. The system of claim 31, wherein the native trigger instruction comprises at least one no-op instruction of the first machine instruction set.

33. An analysis method, comprising:
assigning at least one native instruction of a first machine instruction set proximate a selected construct of a binary program to be a trigger to invoke analysis code;
generating a trigger map file that stores information specifying instrumented triggers in the program including the assigned trigger and further stores information indicative of the assigned native instruction of the assigned trigger;
generating a trigger parameter file that stores information for providing parameter information for the specified triggers in the program and further stores information for determining analysis code to be invoked in response to the trigger;
interpreting, by using the information stored in the trigger map file and the information stored in the trigger parameter file, the binary program by an interpreter on a first processor, wherein the binary program is configured for native execution on a second processor,
wherein during the interpretation and upon interpreting the assigned native instruction, identifying the assigned native instruction as the trigger; and
invoking, in response to the identifying, the analysis code by the interpreter at the trigger instruction in the binary program, wherein the analysis code includes machine instructions for processing directly on the first processor, and wherein the analysis code has been compiled prior to the execution of the interpreter; and
executing the binary program, including the trigger instruction, natively on the second processor.

34. The method of claim 33, wherein invoking the analysis code comprises providing to the analysis code at least one item selected from the group comprising: a register value, a memory value, a program counter address, branch instructions, and an effective address.

35. The method of claim 33, additionally comprising registering the analysis code with the interpreter via a predefined application programming interface.

36. The method of claim 35, additionally comprising identifying at least one trigger using the predefined application programming interface, wherein encountering the trigger during interpretation causes the analysis code to be invoked.

37. The method of claim 33, wherein interpretation comprises emulation.

38. The method of claim 33, wherein interpretation comprises simulation.

39. The method of claim 33, wherein the native trigger instruction comprises at least one machine instruction that does not substantially affect the performance of the binary program.

40. The method of claim 39, wherein the native trigger instruction comprises at least one no-op instruction of the first machine instruction set.

41. A computer readable storage medium having stored thereon instructions that when executed cause a first processor of computer to:
assign at least one native instruction proximate a construct of a binary program to be a trigger to invoke analysis code;
generate a trigger map file that stores information specifying instrumented triggers in the program including the assigned trigger and further stores information indicative of the assigned native instruction of the assigned trigger;
generate a trigger parameter file that stores information for providing parameter information for the specified triggers in the program and further stores information for determining analysis code to be invoked in response to the trigger; and
interpret by using the information stored in the trigger map file and the information stored in the trigger parameter file and by an interpreter a binary program on the first processor, wherein the binary program includes machine instructions from a machine instruction set of a second processor, wherein during the interpretation, and upon encountering a selected machine instruction from the machine instruction set of the second processor:
identify the assigned native instruction as the trigger, and
invoke the analysis code by the interpreter via a predefined interface and executed natively on the first processor in response to identifying the trigger, wherein the analysis code includes native machine instructions for processing directly on the first processor.

42. The computer readable storage medium of claim 41, additionally comprising a predefined application programming interface that is defined by the interpreter so as to allow the analysis code to register and to define one or more callback routines.

43. The computer readable storage medium of claim 41, wherein interpretation comprises emulation.

44. The computer readable storage medium of claim 41, wherein interpretation comprises simulation.

45. The medium of claim 41, wherein the selected machine instruction comprises at least one machine instruction that does not substantially affect the performance of the binary program.

46. The medium of claim 45, wherein the selected machine instruction comprises at least one no-op instruction of the first machine instruction set.

* * * * *

UNITED STATES PATENT AND TRADEMARK OFFICE
CERTIFICATE OF CORRECTION

PATENT NO.        : 7,475,394 B2
APPLICATION NO. : 10/729100
DATED             : January 6, 2009
INVENTOR(S)       : Brad Calder et al.

It is certified that error appears in the above-identified patent and that said Letters Patent is hereby corrected as shown below:

At Column 14, Line 21, after "inserting" please delete "a".

At Column 14, Line 52, please delete "triggers" and insert therefore, --trigger--.

Signed and Sealed this

Tenth Day of November, 2009

David J. Kappos
*Director of the United States Patent and Trademark Office*